Aug. 25, 1953  J. REMMEN  2,649,646
POWER FEED MECHANISM FOR MACHINE TOOLS
Filed Oct. 12, 1949  3 Sheets-Sheet 1
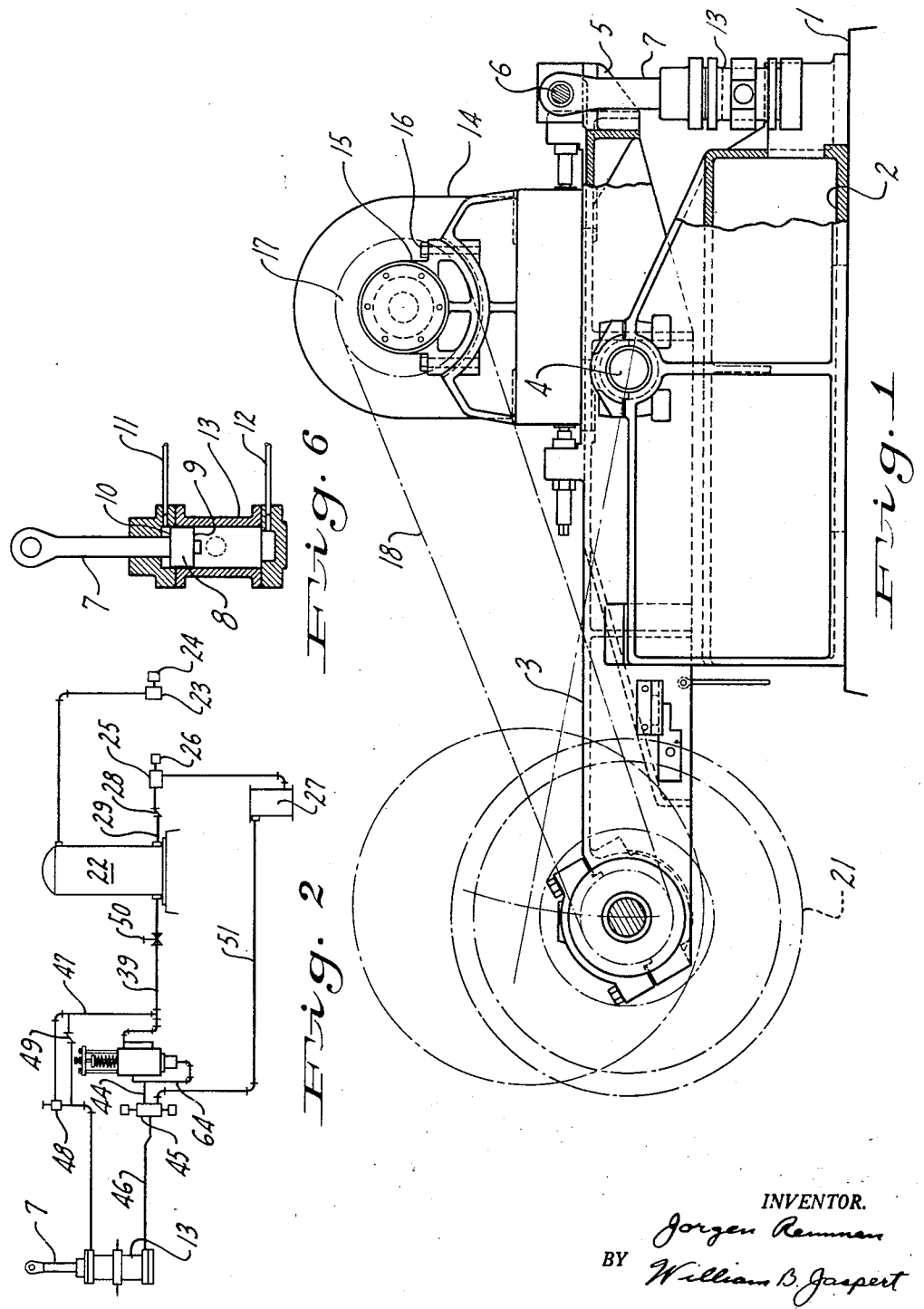
INVENTOR.
Jorgen Remmen
BY William B. Jaspert
Attorney.

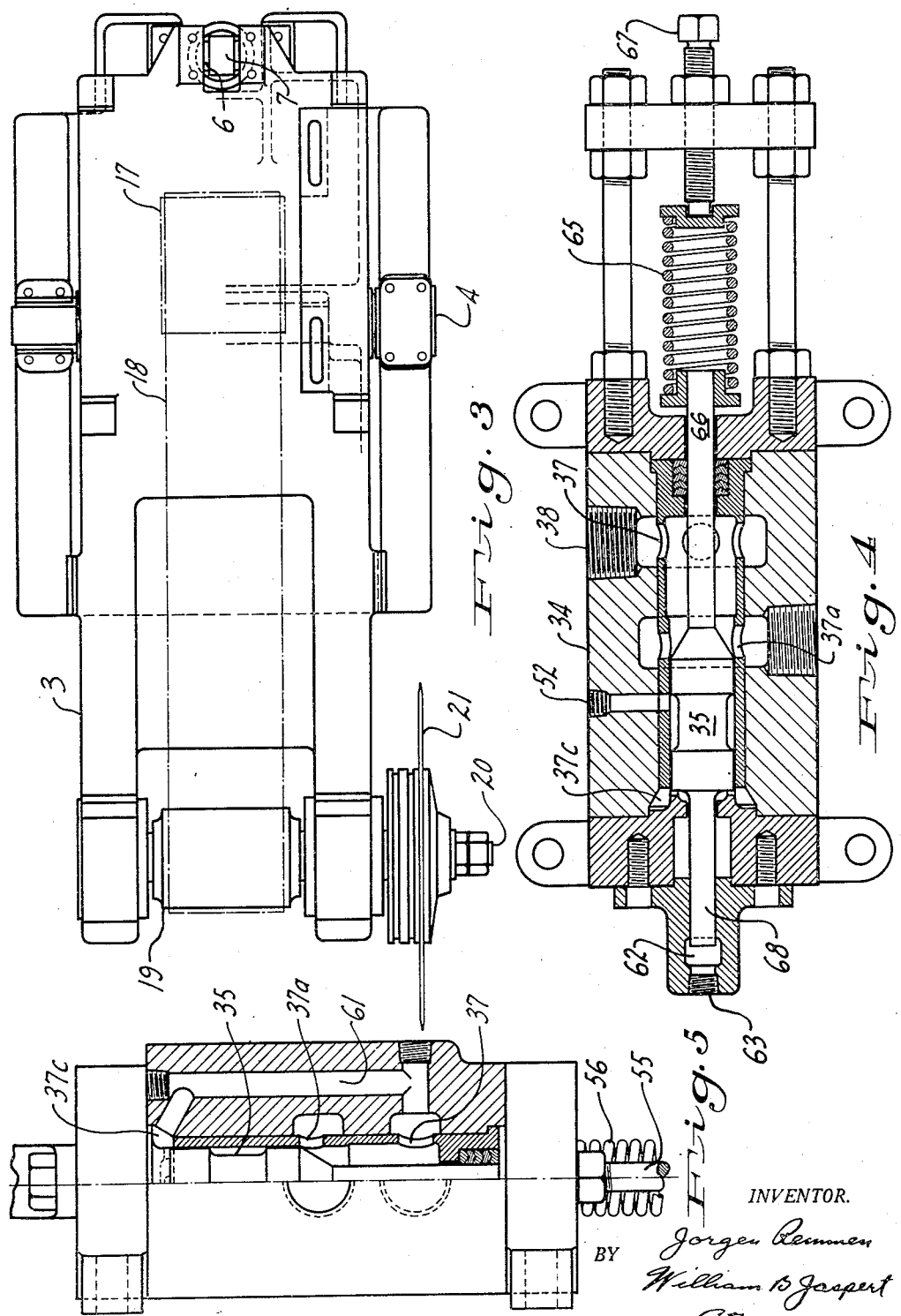

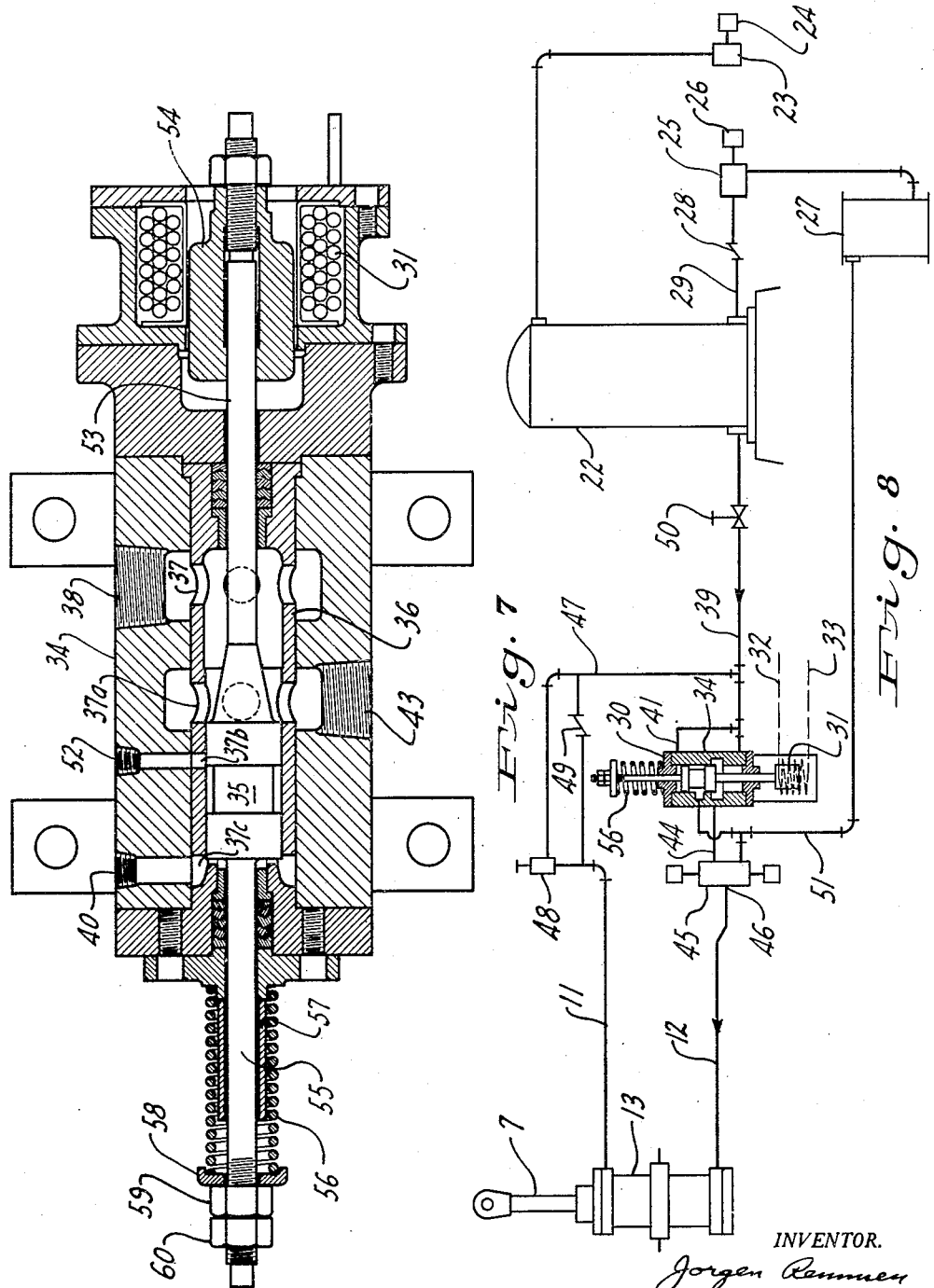

Patented Aug. 25, 1953

2,649,646

UNITED STATES PATENT OFFICE 2,649,646

POWER FEED MECHANISM FOR MACHINE TOOLS

Jorgen Remmen, Pittsburgh, Pa.

Application October 12, 1949, Serial No. 120,863

5 Claims. (Cl. 29—69)

1

This invention relates to new and useful improvements in feed mechanism for power saws and the like which is adapted to maintain substantially constant load on the motor, and it is among the objects thereof to provide hydraulic actuating means for feeding power tools which may be electrically or hydraulically controlled to be automatically responsive to the load on the tool to regulate the rate of feeding.

The invention will become more apparent from a consideration of the accompanying drawings, constituting a part hereof, in which like reference characters designate like parts, and in which:

Fig. 1 is a side elevational view, partially in cross section, of a power driven saw embodying the principles of this invention;

Fig. 2 a diagrammatic view of an hydraulic operating and control mechanism for feeding the saw in its cutting movements;

Fig. 3 a top plan view of the power saw of Fig. 1;

Fig. 4 a longitudinal cross sectional view of an hydraulic feed mechanism;

Fig. 5 a cross sectional view, partially in elevation, of a modified form of hydraulic feed mechanism;

Fig. 6 a vertical cross sectional view partially in elevation of an hydraulic operating cylinder and piston;

Fig. 7 a cross sectional view of a modified form of hydraulic feed mechanism; and Fig. 8 a diagrammatic view of the operating cylinder and control mechanism therefor.

With reference to Figs. 1 and 3 of the drawing, numeral 1 designates a support on which is mounted a machine base 2 for pivotally supporting a beam 3 by a pivot bearing 4. Beam 3 has a restricted portion 5 connected by a wrist pin 6 to a piston rod 7 of a piston 8, Fig. 6. The piston 8 has an area 9 double that of the area 10 giving a two to one ratio of the pressure differential on opposite sides of the piston if the pressure in lines 11 and 12 leading to the cylinder 13 is equal. The cylinder 13 is mounted on the base 2 as shown in Fig. 1.

Mounted on the beam 3 is a motor 14 having one end of its shaft journaled in a cradle bearing 15 which is secured by bolts 16. By removing bolts 16 bearing 15 may be turned 180° to provide clearance to remove the V-belts from a pulley 17. Pulley 17 carries V-belts 18 that are mounted in V-grooves of a pulley 19 on shaft 20 that carries a cutting saw 21. The pressure fluid for operating piston 8 to tilt the feed beam 3

2 downward in its cutting movement to feed the saw 21 to the work is supplied by a pressure tank 22, Fig. 8, which contains oil under pressure, an air pump 23 driven by a motor 24 supplying the air pressure to the tank 22, and an oil pump 25 driven by a motor 26 supplying the oil to tank 22 from a sump 27, a check valve 28 being interposed in the line 29 between the tank 22 and the pump 25.

The pressure fluid from tank 22 is directed to the hydraulic feed mechanism or cylinder 13 and automatically regulated by an hydraulic valve generally designated by the numeral 30, having a solenoid 31 connected by lines 32 and 33 to the main leads of the motor 14. The valve 30, which is more clearly shown in Fig. 7, consists of a valve housing 34 and a spool valve 35. A ported sleeve 36 in housing 34 constitutes the valve chamber which through the port 37 is connected to the source of pressure fluid by the threaded connection 38 to the flow line 39, Fig. 8. One end of the valve chamber is provided with a flow connection 40 to line 41, Fig. 8, the line 41 joining the main feed line 39, as shown. The threaded connection 43 of the valve housing, Fig. 7, connects the flow line 44 to a solenoid operated four-way valve 45 having a flow connection 46 to the bottom of the cylinder 13. A by-pass connection 47 connects the main line 39 with the upper side of cylinder 13, a regulating needle valve 48 and a check valve 49 being provided in the by-pass line. Check valve 49 is open for full flow to cylinder 13. A stop valve 50 is provided in line 39 and a return line 51 connects the valve chamber to a relief passage 52 of the valve 34 for returning the pressure fluid to the sump 27, Fig. 8.

Valve 35 is provided with a valve stem 53 on which is mounted an armature 54 that is actuated by solenoid 31, and valve 35 is also provided with a valve stem 55 carrying a coil spring 56 that preloads the valve 35 to normally maintain it in the position where the pressure feed connection 38 is open to the cylinder feed line 43, as shown in Fig. 7. Spring 56 is disposed around a sleeve 57 and may be adjusted by means of a flanged washer 58 and adjusting nuts 59 and 60, the adjustment and strength of the spring determining the load at which the solenoid 31 is operative to move the valve to its port closing position. For convenience the valve ports are numbered 37, 37a, 37b and 37c, Fig. 7.

As shown in Fig. 5 of the drawings, the gland 57 communicates with the end port 37c by a by-pass connection 61 to equalize the pressure on both ends of valve 35 to make it a pressure balanced valve.

With reference to Figs. 4 and 2 of the drawings, the valve housing 34, instead of being provided with a solenoid like the valve in Fig. 7, is provided with a fluid pressure chamber 62 having a threaded connection 63 with the pressure feed line 44 that is connected with the gland 37a as shown in Fig. 2, through line 64, Fig. 2. The same by-pass connection 61, as shown in Fig. 5, maintains equal pressures on both ends of the spool valve 35. An adjustable loading spring 65 acts on the valve stem 66, Fig. 4, the tension on the spring being adjustable by a set screw 67. In Fig. 4 the valve stem 68 constitutes a piston that is responsive to the pressure in chamber 62.

The operation of the above described mechanism is briefly as follows:

The motor 14 is energized to drive the saw 21 by the V-belt drive 18. Pressure fluid is supplied to the feed operating cylinder 13 by energizing the solenoid valve 45. In the use of the type of valve illustrated in Fig. 7 and connected as shown in Fig. 8, the pressure fluid maintained in the tank 22 is delivered through line 39, Fig. 8, with stop valve 50 opened, and passes through the line 11 to the upper end of the piston 8. This pressure fluid is constantly applied to the upper area 10 of piston 8. It is also supplied to the lower face 9 of piston 8 by the spool valve mechanism 30, Fig. 8, by passing through the inlet 38, port 37 and out through the port 37a to the outlet connection 43, from which it passes through the line 44, the four-way valve 45, line 46 to the cylinder feed line 12. Since the effective piston area 9 is double that of the piston area 10, the piston 8 will be raised to cause the feed arm 3 to tilt on the trunnion bearing 4, moving the saw downward in the direction of the work. If the rate of feed is such as to appreciably increase the torque on the motor 14, or in other words, if the load on the saw increases, the current of the motor windings, solenoid 31, which is connected to the motor leads by the lines 32 and 33, Fig. 8, will become energized to move the spool valve 35 to the right, as viewed in Fig. 7 of the drawings, to shut off port 37a, thus shutting off or reducing the pressure fluid supplied to cylinder 13 through line 12 to stop or reduce the feeding pressure until the saw has cut itself free, thus reducing the load on the motor 14. If the gland controlling port 37a overtravels, so as to leave pressure from port 37 inbetween the two glands of the spool valve, it will be relieved through the outlet 52. By proper adjustment of the spring 56, the load on valve 35 at which solenoid 31 is effective to move the valve may be predetermined, this load being the load that determines the proper feeding rate of the saw at which motor 14 will operate at substantially constant torque.

In the form of valve shown in Figs. 2 and 4, where no solenoid is employed, the feed mechanism is responsive to load variations to regulate the load on the motor by virtue of the fact that when resistance to the piston 8 increases, due to increased load on the saw, the pressure will build up in the line 64 and in chamber 62 to actuate the piston 68 of valve 35 to move the valve to the right as viewed in Fig. 4 of the drawings, against the action of the coil spring 65. It is thus seen that automatic feed control for maintaining constant load on the motor may be assured either electrically by the solenoid control or hydraulically by the fluid pressure control on the spool valve piston.

Although several embodiments of the invention have been herein illustrated and described, it will be apparent to those skilled in the art that various modifications may be made in the details of construction without departing from the principles herein set forth.

I claim:

1. In a power feed mechanism for machine tools or the like, a base, a beam pivotally mounted on said base, a cutting tool mounted on an extended end of said beam, an electric motor mounted on said beam for driving said tool, an hydraulic actuator for tilting said beam to feed the tool in its cutting movement, said actuator including a cylinder, a piston in said cylinder connected to the other end of said beam, and a source of pressure fluid for said actuator communicating with said cylinder on one side of the piston to maintain constant pressure on said piston in the direction to retract said beam, and valve mechanism for controlling the application of the pressure fluid to the opposite side of said actuator piston to actuate said beam in the direction of feeding the tool, said valve mechanism including electromagnetic means for actuating said valve to control the application of the pressure fluid, said electromagnetic means being electrically connected in the motor circuit to be energized in response to variations in the motor E. M. F. for varying the feeding pressure on the tool to maintain a substantially constant load on the motor.

2. In a power feed mechanism for machine tools or the like, a base, a beam pivotally mounted on said base, a cutting tool mounted on an extended end of said beam, an electric motor mounted on said beam for driving said tool, an hydraulic actuator for tilting said beam to feed the tool in its cutting movement, said actuator including a cylinder, a piston in said cylinder connected to the other end of said beam, and a source of pressure fluid for said actuator communicating with said cylinder on one side of the piston to maintain constant pressure on said piston in the direction to retract said beam, and valve mechanism for controlling the application of the pressure fluid to the opposite side of said actuator piston to actuate said beam in the direction of feeding the tool, said piston being of greater effective area on the tool feeding side and said valve mechanism including electromagnetic means for actuating said valve to control the application of the pressure fluid, said electromagnetic means being electrically connected in the motor circuit to be energized in response to variations in the motor E. M. F. for varying the feeding pressure on the tool to maintain a substantially constant load on the motor.

3. In a power feed mechanism for machine tools or the like, a base, a beam pivotally mounted on said base, a cutting tool mounted on an extended end of said beam, an electric motor mounted on said beam for driving said tool, an hydraulic actuator for tilting said beam to feed the tool in its cutting movement, said actuator including a cylinder, a piston in said cylinder connected to the other end of said beam, and a source of pressure fluid for said actuator communicating with said cylinder on one side of the piston to maintain constant pressure on said piston in the direction to retract said beam, and valve mechanism for controlling the application of the pressure fluid to the opposite side of said actuator piston to actuate said beam in the direction of feeding the tool, said valve mechanism comprising a valve housing having an inlet port connected to the pressure source and having an outlet port connected to the feeding side of the actuator cylinder, a valve movable in said housing normally biased to the open position to effect connection of the pressure source with the hydraulic actuator and said valve having a piston disposed in the pressure chamber of said valve housing, said chamber being connected in communication with the outlet port of the valve housing to actuate the valve piston in response to the fluid pressure acting on the hydraulic actuator to move the valve to closed position when the pressure in the actuator exceeds a predetermined amount.

4. In a power feed mechanism for machine tools or the like, a base, a beam pivotally mounted on said base, a cutting tool mounted on an extended end of said beam, an electric motor mounted on said beam for driving said tool, an hydraulic actuator for tilting said beam to feed the tool in its cutting movement, said actuator including a cylinder, a piston in said cylinder connected to the other end of said beam, and a source of pressure fluid for said actuator communicating with said cylinder on one side of the piston to maintain constant pressure on said piston in the direction to retract said beam, and valve mechanism for controlling the application of the pressure fluid to the opposite side of said actuator piston to actuate said beam in the direction of feeding the tool, said valve mechanism comprising a valve housing having a spool valve slidably mounted therein, said housing having inlet and outlet ports controlled by the valve and said valve being normally biased to open position to expose the hydraulic actuator to the pressure fluid, said valve being adapted to be per se actuated by the pressure fluid delivered to the hydraulic actuator to close the valve when the pressure on the actuator piston is greater than the force of the valve biasing means.

5. In a power feed mechanism for machine tools or the like, a base, a beam pivotally mounted on said base, a cutting tool mounted on an extended end of said beam, an electric motor mounted on said beam for driving said tool, an hydraulic actuator for tilting said beam to feed the tool in its cutting movement, said actuator including a cylinder, a piston in said cylinder connected to the other end of said beam, and a source of pressure fluid for said actuator communicating with said cylinder on one side of the piston to maintain constant pressure on said piston in the direction to retract said beam, and valve mechanism for controlling the application of the pressure fluid to the opposite side of said actuator piston to actuate said beam in the direction of feeding the tool, said valve mechanism comprising a valve housing, a spool valve slidably mounted therein, a spring normally biasing the spool valve to the open position and a solenoid for moving said valve to the closed position, said housing having inlet and outlet connections communicating with the source of pressure fluid and with the hydraulic actuator cylinder, respectively, said solenoid being electrically connected in the motor circuit to be energized in response to variations in the E. M. F. of the motor.

JORGEN REMMEN.

References Cited in the file of this patent

UNITED STATES PATENTS

| Number | Name | Date |
|---|---|---|
| 1,919,489 | Trescham | July 25, 1933 |
| 1,972,560 | Heller | Sept. 4, 1934 |
| 2,049,626 | Rosmussen | Aug. 4, 1936 |
| 2,167,281 | Monroe | July 25, 1939 |
| 2,191,890 | Le Bus | Feb. 27, 1940 |
| 2,249,814 | Easterwood | July 22, 1941 |
| 2,274,226 | Weidmann | Feb. 24, 1942 |
| 2,301,028 | Esch | Nov. 3, 1942 |
| 2,397,974 | Morrow et al. | Apr. 9, 1946 |